April 1, 1924.
C. SCHÜRMANN
1,488,714
BRAKE
Original Filed Dec. 7, 1920
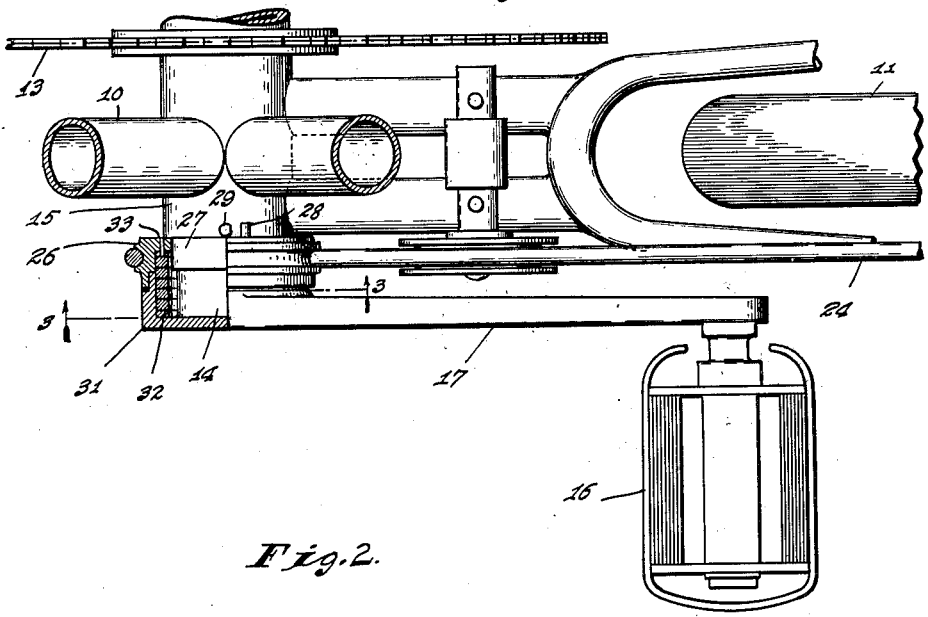
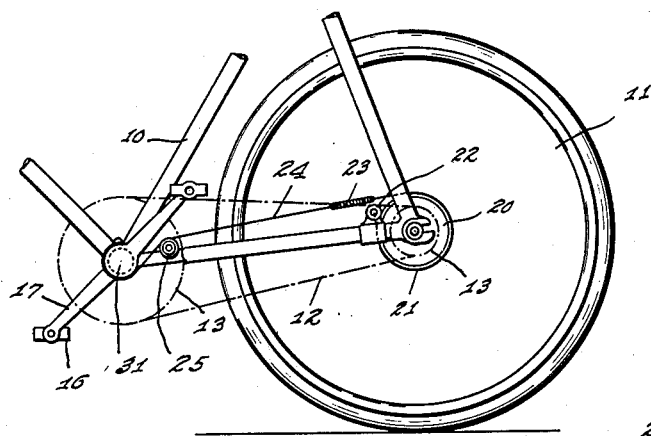
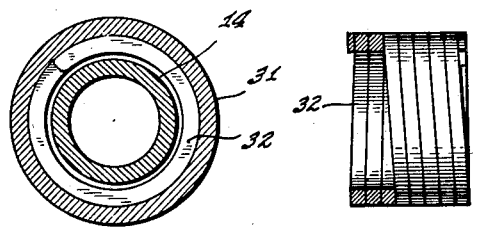
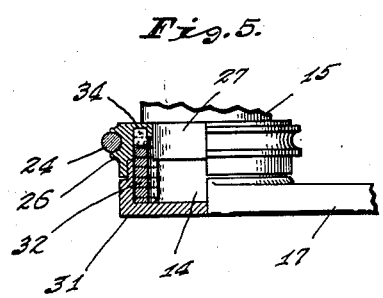
INVENTOR.
Carl Schürmann,
BY
ATTORNEY.

Patented Apr. 1, 1924.

1,488,714

UNITED STATES PATENT OFFICE.

CARL SCHÜRMANN, OF DUSSELDORF, GERMANY.

BRAKE.

Original application filed December 7, 1920, Serial No. 429,012. Divided and this application filed February 3, 1923. Serial No. 616,735.

*To all whom it may concern:*

Be it known that I, CARL SCHÜRMANN, a citizen of German Republic, residing at Dusseldorf, Germany, have invented a new and useful Brake, of which the following is a specification.

It is the object of my invention to provide a simple and effective bicycle brake, which acts efficiently and promptly and without lost motion to produce a braking action by back pedaling, while permitting forward pedaling without interference from the brake.

The present application is a division of my copending application Serial No. 429,012, filed December 7, 1920.

In attaining the aforesaid object in the embodiment of my invention illustrated, I provide a rocking member which by its rocking in opposite directions respectively sets and releases the bicycle brake, as shown by being connected by a flexible member which includes a resilient member to a brake band which is wrapped around a brake drum on the rear wheel of the bicycle in the direction that the friction produced upon the initial setting of the brake tends to set the brake more tightly; and this rocking member is co-axial with and abuts against a rotatable member which rotates with the pedal crank-shaft, as by being carried by such crank-shaft while said rocking member is carried by the frame concentric with the crank-shaft; and between the rocking member and said rotatable member I provide a connection by a helical spring which has a driving connection with one of said members and fits in a recess in the other of said members to lock said two members together when they tend to rotate relatively in the direction to unwind the spring and to unlock them when they rotate relatively in the other direction; and in the preferred form of my invention I provide such driving connection also by having the helical spring in a recess in the member with which said helical spring has such driving connection, so that the helical spring fits into opposed recesses in the two members which it interconnects.

The accompanying drawing illustrates my invention: Fig. 1 is a fragmental horizontal section, just above the pedal crank-shaft, through the frame of a bicycle provided with my invention, the helical spring and associated parts being shown in peripheral section; Fig. 2 is a fragmental side elevation, on a smaller scale, of the rear part of the bicycle shown in Fig. 1; Fig. 3 is an enlarged section through the helical spring and one of its directly associated parts, substantially on the line 3—3 of Fig. 1; Fig. 4 is a side elevation of the helical spring, in partial central longitudinal section; and Fig. 5 is an enlarged section somewhat similar to Fig. 1, showing one end of the helical spring bent to provide a positive anchorage.

The usual bicycle frame 10 has the usual wheels, of which only the rear wheel 11 is shown, and this rear wheel is suitably driven, as by a chain 12 and suitable sprockets 13, from a pedal crank-shaft 14 suitably mounted in a crank-shaft bearing 15 provided in the usual manner in the lower part of the frame 10, the axle of the rear wheel 11 being provided with any known free-wheel device to permit the forward over-running of said rear wheel. The pedal crank-shaft 14 has the usual pedals 16 on the outer ends of the usual crank arms 17.

The axle of the rear wheel 11 is provided with a brake drum 20 carrying a brake band 21, one end of which (the clockwise end as viewed from the left in Fig. 2) being fixed to a pin or bolt on the bicycle frame 10. The brake band 21 is laid around the drum 20 in the direction of turning, and is connected to a flexible member 24, such as a wire, which extends forward over a roller 25 mounted on the lower part of the frame 10. Preferably the flexible member 24 includes a spring 23, shown as a tension spring. The forward end of the flexible member 24, after passing over the roller 25, passes downward and below and partially encircles a sleeve 26, which is provided with a suitable peripheral groove for receiving said flexible member, as is clear from Fig. 1. This sleeve 26 is a rocking member, rotatably mounted on the shouldered end 27 of the hub or bearing 15 of the pedal crank-shaft 14, and may rock in the back-pedaling direction (or clockwise in Fig. 2) on said bearing 15 as far as permitted by the brake 21, while it is limited in its rocking movement in the other or forward-pedaling direction (counter-clockwise in Fig. 2) by co-operating pins or studs 28 and 29 carried by said sleeve 26 and bearing 15 respectively.

The crank arm 17 adjacent to the sleeve 26 is provided with an enlarged hub 31, which thus rotates with the pedal crank-shaft 14. This hub 31 is shown as integral with the crank arm 17, but this is a mere incident as it need not be made in that manner. The hub 31 and sleeve 26 are close together, preferably overlapping each other, and have cylindrical cavities opposed to or facing each other. A helical spring 32 fits into these cavities, so fitting them that it exerts only little outward pressure on the inner cylindrical faces of the cavities. Both ends of the helical spring 32 may be free to turn in the cavities in which they are respectively located, as in the constructions shown in Figs. 3 and 4; or, if desired, one end of the spring 32 may be permanently attached in its recess, as by an anchoring pin 33 such as shown in Fig. 1, or by the bent spring end 34 shown in Fig. 5 and seated in a suitably located hole in the bottom of said recess.

The helical spring 32 acts to permit relative movement between the sleeve 26 and hub 31 in one direction only, and to prevent such relative movement in the other direction. The direction in which such relative motion is permitted is the forward-pedaling motion of the pedal crank-shaft 14, in which motion the friction of the walls of the spring-receiving recesses on the outer surface of the spring tends to wind up said spring, which tendency actually produces a sufficient winding up of the spring to release it from the walls of the recesses, or from the wall of the recess in which it is not permanently anchored if one end of the spring is anchored as shown in Figs. 1 and 5. The direction in which such relative motion is prevented is the back-pedaling motion of the pedal crank-shaft 14, in which motion the friction of the walls of the spring-receiving recesses on the outer surface of the spring tends to unwind said spring, which tendency actually produces a sufficient unwinding of the spring to press such spring with great firmness against the walls of such recesses, the firmness of which pressure increases as the tendency to relative rotation in this direction is increased, so that the two members 15 and 31 are thus rigidly locked together upon any back-pedaling, and the pedal crank-shaft cannot turn in this back-pedaling direction without correspondingly turning the sleeve 26. In consequence, the pedal crank-shaft 14 may be pedaled forward freely, as when so pedaled the drag of the hub 31 tends to wind up the spring 32, and the sleeve 26 is moved in the same direction only by the very slight frictional drag and by the action of the spring 23 and the unwinding of the brake band 21 until the pins 28 and 29 engage, at which time the brake band 21 is released from the drum 20. The drag of the spring 32 on the hub 31 is practically negligible for forward pedaling, so that there may be free forward pedaling. However, as soon as back pedaling is started, the drag of the hub 31 on the spring 32 unwinds such spring slightly, which locks the hub 31 and sleeve 15 together, so that such sleeve turns with said hub; and this turning of the sleeve 15 in the back-pedaling direction pulls forward the flexible member 24, which acts through the spring 23 to set the brake band 21 on the brake drum 20. This brake setting is easily obtained, without great effort, because upon initial brake-setting the drag of the drum 20 on the brake band 21 tends to assist in the setting of the brake.

I claim as my invention:

1. A brake, comprising a rotary driven member, a rotary driving member therefor for driving the driven member forward, a brake for said driven member, a rocking member which by its rocking in opposite directions respectively sets and releases said brake, a rotatable member rotatable with said driving member, said rotatable member and said rocking member being co-axial and having axially abutting faces with alined circular recesses in them, a single helical spring fitting in said recesses to lock said co-axial members together when they tend to turn relatively in the direction to unwind said spring and to unlock them when they are turned relatively in the direction to wind said spring.

2. A brake, comprising a rotary driven member, a rotary driving member therefor for driving the driven member forward, a brake for said driven member, a rocking member which by its rocking in opposite directions respectively sets and releases said brake, a rotatable member rotatable with said driving member, said rotatable member and said rocking member being co-axial and one of them having a circular recess in its end face, and a single helical spring having a driving connection with the other of said two co-axial members and fitting in said recess to lock said co-axial members together when they tend to turn relatively in the direction to unwind said spring and to unlock them when they are turned relatively in the direction to wind said spring.

3. A brake, comprising a rotary driven member, a rotatable driving member therefor for driving the driven member forward, said driven member having a brake drum, a brake band co-operating with said brake drum, a rocking member co-axial with said driving member, a flexible member connecting said brake band to said rocking member, said driving member including a member which abuts axially against said rocking member, the axially abutting faces of said two abutting members having alined circular recesses in them, and a single helical spring fitting in said recesses to lock said co-axial members together when they tend to turn relatively in the direction to unwind said spring and to unlock them when they are turned relatively in the direction to wind said spring.

4. A brake, comprising a rotary driven member, a rotatable driving member therefor for driving said driven member forward, said driven member having a brake drum, a brake band co-operating with said brake drum, a rocking member co-axial with said driving member, a flexible member connecting said brake band to said rocking member, said driving member including a member in axial alinement with said rocking member, one of said axially alined members having a circular recess in its end face, and a single helical spring having a driving connection with the other of said two co-axial members and fitting in said recess to lock said co-axial members together when they tend to turn relatively in the direction to unwind said spring and to unlock them when they are turned relatively in the direction to wind said spring.

5. A brake, comprising a rotary driven member, a rotatable driving member therefor for driving the driven member forward, said driven member having a brake drum, a brake band co-operating with said brake drum, a rocking member co-axial with said driving member, a flexible member connecting said brake band to said rocking member, the connection from said brake band to said rocking member through said flexible member including a spring, said driving member including a member which abuts axially against said rocking member, the axially abutting faces of said two abutting members having alined circular recesses in them, and a single helical spring fitting in said recesses to lock said co-axial members together when they tend to turn relatively in the direction to unwind said spring and to unlock them when they are turned relatively in the direction to wind said spring.

6. A brake, comprising a rotary driven member, a rotatable driving member therefor for driving said driven member forward, said driven member having a brake drum, a brake band co-operating with said brake drum, a rocking member co-axial with said driving member, a flexible member connecting said brake band to said rocking member, the connection from said brake band to said rocking member through said flexible member including a spring, said driving member including a member in axial alinement with said rocking member, one of said axially alined members having a circular recess in its end face, and a single helical spring having a driving connection with the other of said two co-axial members and fitting in said recess to lock said co-axial members together when they tend to turn relatively in the direction to unwind said spring and to unlock them when they are turned relatively in the direction to wind said spring.

7. A brake, comprising a rotary driven member, a rotatable driving member therefor for driving the driven member forward, said driven member having a brake drum, a brake band co-operating with said brake drum and wound around it in the direction of forward rotation from a fixed anchorage, a rocking member co-axial with said driving member, a flexible member connecting said brake band to said rocking member, and an over-running connecting device for interconnecting said rocking member and said driving member when the driving member is moved backward and disconnecting them when the driving member is moved forward.

8. A brake, comprising a rotary driven member, a rotatable driving member therefor for driving the driven member forward, said driven member having a brake drum, a brake band co-operating with said brake drum, a rocking member co-axial with said driving member, a flexible member connecting said brake band to said rocking member, the connection from said brake band to said rocking member through said flexible member including a spring, and an over-running connecting device for interconnecting said rocking member and said driving member when the driving member is moved backward and disconnecting them when the driving member is moved forward.

9. A brake, comprising a rotary driven member, a rotatable driving member therefor for driving the driven member forward, said driven member having a brake drum, a brake band co-operating with said brake drum and wound around it in the direction of forward rotation from a fixed anchorage, a rocking member co-axial with said driving member, a flexible member connecting said brake band to said rocking member, the connection from said brake band to said rocking member through said flexible member including a spring, and an over-running connecting device for interconnecting said rocking member and said driving member when the driving member is moved backward and disconnecting them when the driving member is moved forward.

CARL SCHÜRMANN.